United States Patent
Gottwald et al.

(10) Patent No.: US 10,673,123 B2
(45) Date of Patent: Jun. 2, 2020

(54) RADIO FREQUENCY TRANSMITTING/RECEIVING ELEMENT AND METHOD FOR PRODUCING A RADIO FREQUENCY TRANSMITTING/RECEIVING ELEMENT

(71) Applicant: Schweizer Electronic AG, Schramberg (DE)

(72) Inventors: Thomas Gottwald, Dunningen (DE); Christian Roessle, St. Georgen (DE); Alexander Neumann, Rottweil (DE)

(73) Assignee: SCHWEIZER ELECTRONIC AG, Schramberg (DE)

( * ) Notice: Subject to any disclaimer, the term of this patent is extended or adjusted under 35 U.S.C. 154(b) by 372 days.

(21) Appl. No.: 15/636,893

(22) Filed: Jun. 29, 2017

(65) Prior Publication Data

US 2018/0006358 A1 Jan. 4, 2018

(30) Foreign Application Priority Data

Jul. 4, 2016 (DE) .......................... 10 2016 212 129

(51) Int. Cl.
*H01Q 1/22* (2006.01)
*G01S 7/03* (2006.01)
(Continued)

(52) U.S. Cl.
CPC .............. *H01Q 1/2225* (2013.01); *G01S 7/02* (2013.01); *G01S 7/03* (2013.01); *G06K 19/0773* (2013.01); *H01Q 1/38* (2013.01)

(58) Field of Classification Search
CPC .......... H01Q 1/38; H01Q 1/40; H01Q 15/142; H01Q 21/0087; H01Q 1/2225; G01S 7/03;
(Continued)

(56) References Cited

U.S. PATENT DOCUMENTS 5,191,351 A * 3/1993 Hofer ................... H01Q 1/36
343/708
6,687,969 B1 * 2/2004 Dando ................ H05K 3/007
29/423
(Continued)

FOREIGN PATENT DOCUMENTS

DE 10 2015 113 322 11/2016

OTHER PUBLICATIONS

Office Action in the priority application DE 10 2016 212 129.4, dated Jun. 14, 2017.

*Primary Examiner* — Peter M Bythrow
(74) *Attorney, Agent, or Firm* — Shlesinger, Arkwright & Garvey LLP

(57) ABSTRACT

A method for producing a radio frequency transmitting/receiving element comprising at least one radio frequency antenna and at least one radio frequency chip, and to a corresponding radio frequency transmitting/receiving element made by the method. The method comprises the following steps: providing a temporary rigid carrier; applying a conductor pattern structure comprising the antenna structure of the at least one radio frequency antenna and connection contacts—connected thereto via leads—for the at least one radio frequency chip; arranging the at least one radio frequency chip on the connection contacts of the conductor pattern structure; applying an electrically insulating layer on the conductor pattern structure, such that the at least one radio frequency chip is surrounded by the electrically insulating layer; and removing the temporary rigid carrier.

20 Claims, 6 Drawing Sheets

(51) Int. Cl.
*G01S 7/02* (2006.01)
*G06K 19/077* (2006.01)
*H01Q 1/38* (2006.01)

(58) Field of Classification Search
CPC .............. G01S 7/032; G06K 19/0773; H05K 2203/0147–2203/0173
See application file for complete search history.

(56) References Cited

U.S. PATENT DOCUMENTS

| | | | |
|---|---|---|---|
| 2004/0077124 A1* | 4/2004 | Ogawa | H01L 21/4857 438/106 |
| 2005/0117312 A1* | 6/2005 | Kimura | H05K 1/186 361/746 |
| 2005/0253664 A1* | 11/2005 | Hyvonen | H01Q 9/0421 333/101 |
| 2007/0111391 A1* | 5/2007 | Aoki | H01Q 1/38 438/118 |
| 2008/0096366 A1* | 4/2008 | Aoki | H01L 24/97 438/455 |
| 2008/0196930 A1* | 8/2008 | Tuominen | H01L 23/5389 174/260 |
| 2009/0025971 A1* | 1/2009 | Kanemaru | H01L 23/5389 174/260 |
| 2009/0283891 A1* | 11/2009 | Dekker | H01L 23/5387 257/690 |
| 2011/0304520 A1* | 12/2011 | Djordjevic | H01Q 21/0087 343/893 |
| 2014/0071021 A1* | 3/2014 | Liu | H01L 23/5227 343/893 |
| 2015/0024523 A1* | 1/2015 | Virtanen | H01Q 1/38 438/26 |
| 2015/0373829 A1* | 12/2015 | Ishikawa | H05K 1/028 174/254 |
| 2017/0250466 A1* | 8/2017 | Schlaffer | H01Q 1/38 |
| 2018/0006358 A1* | 1/2018 | Gottwald | G01S 7/02 |

* cited by examiner

RADIO FREQUENCY TRANSMITTING/RECEIVING ELEMENT AND METHOD FOR PRODUCING A RADIO FREQUENCY TRANSMITTING/RECEIVING ELEMENT

FIELD OF THE INVENTION

The invention relates to a method for producing a radio frequency transmitting/receiving element comprising at least one radio frequency antenna and at least one radio frequency chip, and to a corresponding radio frequency transmitting/receiving element.

BACKGROUND OF THE INVENTION

In the prior art, radio frequency transmitting/receiving elements are often utilized for radar applications and are used e.g. as distance warning units in automobiles. In this case, correspondingly known radar elements have an antenna and a radar package—an integrated circuit in a chip housing—connected thereto. The antenna is regularly constructed in two parts comprising a transmitting antenna and a receiving antenna, which are often embodied as a conductor pattern on a circuit board.

The radar package is produced separately from the radar antenna and can be arranged laterally alongside the conductor pattern for the transmitting antenna and for the receiving antenna on the circuit board thereof.

What is disadvantageous about the radar elements in accordance with this prior art is that the radar packages must be produced separately from the radar antennas, a cost-intensive packaging of the integrated circuit regularly being required.

Moreover, the radar package can only be secured on the circuit board after the latter has been manufactured. The radar element in accordance with the prior art thus requires a placement process in its production. Both the placement process itself and the necessarily resulting exterior arrangement of the radar packages on the circuit board can be fundamentally disadvantageous for the reliability of the radar element.

SUMMARY OF THE INVENTION

It is an object of the present invention to provide a method for producing a radio frequency transmitting/receiving element and a corresponding radio frequency transmitting/receiving element which no longer have the disadvantages known from the prior art or have said disadvantages only to a reduced extent.

This object is achieved by means of a method and a radio frequency transmitting/receiving element as disclosed herein. Features of the invention relate to advantageous developments.

Accordingly, the invention relates to a method for producing a radio frequency transmitting/receiving element comprising at least one radio frequency antenna and at least one radio frequency chip, comprising the following steps:
a. providing a temporary rigid carrier;
b. applying a conductor pattern structure comprising the antenna structure of the at least one radio frequency antenna and connection contacts—connected thereto via leads—for the at least one radio frequency chip;
c. arranging the at least one radio frequency chip on the connection contacts of the conductor pattern structure;
d. applying an electrically insulating layer on the conductor pattern structure, such that the at least one radio frequency chip is surrounded by the electrically insulating layer; and
e. removing the temporary rigid carrier.

Furthermore, the invention relates to a radio frequency transmitting/receiving element comprising at least one radio frequency antenna and at least one radio frequency chip, wherein the at least one radio frequency antenna is an antenna structure embodied as part of a planar conductor pattern structure applied on an electrically insulating layer, and wherein the at least one radio frequency antenna is connected to a radio frequency chip, wherein the at least one radio frequency chip is directly connected to connection contacts embodied as part of the conductor pattern structure, said connection contacts being connected to the at least one radio frequency antenna via leads, and is integrated into the electrically insulating layer in such a way that it is surrounded by the electrically insulating layer.

In the case of the radio frequency transmitting/receiving element according to the invention, the radio frequency chip for generating waves in the radio frequency range (that is to say generally above 1 GHz) to be emitted via the antenna structure and/or for evaluating radio frequency waves received via the antenna structure is directly integrated into the carrier layer of the radio frequency antenna. By virtue of the radio frequency chip being arranged in the electrically insulating layer below the conductor pattern structure forming the antenna structure, the extent of the radio frequency transmitting/receiving element in the plane of the antenna structure can substantially be restricted to the extent of the antenna structure and the leads thereof.

In particular, it is not necessary to arrange further components of a radio frequency transmitting/receiving element laterally alongside the antenna structure.

By virtue of the radio frequency chip being integrated according to the invention into the electrically insulating layer of the radio frequency transmitting/receiving element, it is also possible to dispense with complex packaging of the radio frequency chip. Rather, the radio frequency chip without a separate housing can be arranged on the conductor pattern structure. Particularly if the radio frequency chip is completely surrounded by the electrically insulating layer and possibly further layers, said radio frequency chip can be sufficiently protected against customary environmental influences. As a result of this integration of the radio frequency chip into the electrically insulating layer below the conductor pattern structure and as a result of the direct arrangement of the chip on the antenna structure, a high reliability of the radio frequency chip and of the radio frequency transmitting/receiving element as such is achieved.

Moreover, as a result of the direct proximity of antenna structure and radio frequency chip, the length of the transmission paths that have to be formed for radio frequency signals can be kept extremely short, as a result of which the use of radio frequency-suitable material required for reducing the conduction losses as carrier material for the lines can also be reduced.

For the production of the radio frequency transmitting/receiving element according to the invention, firstly a temporary rigid carrier is provided. The indication "temporary" clarifies the fact that although this rigid carrier is needed during production, it is no longer present in the completed radio frequency transmitting/receiving element. In this context, "rigid" means that the carrier has a sufficient bending stiffness such that undesired bending of the carrier and/or of the components arranged thereon does not occur during the production of the radio frequency transmitting/receiving element. The bending stiffness can regularly be achieved by means of a sufficient thickness of the carrier. The temporary rigid carrier can consist e.g. of copper, nickel-plated copper or copper-plated aluminium, wherein the nickel-plated copper can comprise a layer sequence of copper-nickel-copper in which, in particular, the copper ply mentioned first is thicker than the copper ply mentioned last. Other material combinations can likewise be used. A carrier composed of a corresponding material is suitable both for applying a conductor pattern structure and an electrically insulating layer—as will be explained below—and for the later detachment thereof, e.g. by chemical dissolution or etching. On the side on which the final radio frequency transmitting/receiving element is produced, as described below, the temporary rigid carrier preferably comprises a thin copper layer.

On the temporary rigid carrier provided, a conductor pattern structure is applied according to an arbitrary method that is customary and known to the person skilled in the art, e.g. applied by plating. In this case, the conductor pattern structure comprises the antenna structure and connection contacts for the later connection of the antenna structure to the radio frequency chip. The antenna structure comprises at least one conductor arrangement suitable as an antenna for radio frequency signals. It is preferred, however, if the antenna structure has at least two conductor arrangements suitable as an antenna for radio frequency signals, such that one portion of the conductor arrangements can be provided for emitting radio frequency signals, and the other portion for receiving radio frequency signals. A connection of the antenna structure to the radio frequency chip is made possible via the connection contacts, wherein it suffices if a connection contact connected via a lead is provided for each conductor arrangement of the antenna structure that is suitable as an antenna for radio frequency signals. The conductor pattern structure can furthermore comprise lines having connection contacts for the radio frequency chip, via which the radio frequency chip can be connected to further external components, such as e.g. a control device or an energy supply.

In the next step, at least one radio frequency chip is arranged on the conductor pattern structure in such a way that the respective radio frequency chip is connected to the connection contacts of the conductor pattern that are provided for it. The radio frequency chip can be connected to the conductor pattern structure in a manner that is customary and known to the person skilled in the art.

Afterwards, an electrically insulating layer is applied on the conductor pattern structure. In this case, the layer can preferably be constructed from radio frequency-suitable preimpregnated fibre mats (prepregs) or from resin films which are applied and subsequently pressed in a manner known to the person skilled in the art. In this case, the electrically insulating layer can be formed by a plurality of plies of prepregs or resin films being stacked one on top of another, wherein the plies closest to the conductor pattern structure preferably have cutouts for the at least one radio frequency chip, while at least one ply remote from the conductor pattern structure is preferably free of cutouts. A corresponding arrangement of the plies makes it possible to ensure that the at least one radio frequency chip is surrounded by the electrically insulating layer on all sides facing away from the conductor pattern structure. It is also possible for the electrically insulating layer to be formed from just one ply of prepreg or resin film.

In order to fill the region between the radio frequency chip and the conductor pattern structure—in order that the radio frequency chip is surrounded by the electrically insulating layer on this side as well—resin that already emerges during the pressing of the prepregs or resin films possibly used and flows into the region mentioned can be sufficient. If complete filling of the region between the radio frequency chip and the conductor pattern structure cannot be reliably ensured in this way and/or if the electrically insulating layer is formed differently and in particular without the use of resin, it is possible to employ so-called underfilling methods which are generally known to the person skilled in the art and in which said region is filled with electrically insulating material before the rest of the electrically insulating layer is applied. The underfilling then forms part of the electrically insulating layer.

It is preferred if the radio frequency chip is completely surrounded by the electrically insulating layer. This can be achieved in particular in the case of a construction of the electrically insulating layer made from a plurality of plies of prepregs or resin films if the at least one ply of prepreg or resin film that is remote from the conductor pattern structure is free of cutouts and if—if necessary—an underfilling is provided. The radio frequency chip is then well protected against customary environmental influences.

Independently of how the electrically insulating layer is formed, it is preferred if it is composed of radio frequency-suitable material. It is further preferred if the layer in question is flexible, such that a bending of the electrically insulating layer is possible in a non-destructive manner.

A rear side conductor layer can be provided, the at least one conductor track of which is arranged on the electrically insulating layer and preferably leads into at least one contact location which projects through the electrically insulating layer to the radio frequency chip and is connected thereto. For the rear side contacting of the radio frequency chip, as early as during the production of the electrically insulating layer it is possible to provide at least one suitable perforation, e.g. as a vacancy in the corresponding plies of the prepregs or resin films. It is also possible, however, for the at least one opening required for the rear side contacting of the radio frequency chips to be provided only after the electrically insulating layer has been fitted. The rear side conductor layer can be composed of copper and applied by methods known to the person skilled in the art.

The rear side conductor layer can have an arbitrary conduction pattern chosen by the person skilled in the art. It is preferred here if the rear side conductor layer is embodied as a heat spreading layer. To that end, at least a portion of the conductor tracks of the rear side conductor layer in particular in regions near the respective contact locations can have a greater width than would be necessary solely for conducting electric current. Heat emanating from the radio frequency chip then passes via the contact locations to the conductor tracks and can be dissipated better on account of the greater width chosen for the conductor tracks. It is also possible for at least a portion of the conductor tracks of the rear side conductor layer to be provided exclusively for the dissipation of heat and thus not for carrying current. In this regard, e.g. the rear side of the radio frequency transmitting/receiving element can be covered over the whole area with a conductor area that serves solely for heat spreading.

It is also possible for the conduction pattern of the rear side conductor layer to have a continuous area that is preferably connected to the earth contact of the radio frequency transmitting/receiving element. As a result, a dissipation of undesired capacitive effects is also achieved besides the heat spreading. Particularly if an electrically conductive connection between rear side conductor layer and radio frequency chip is not required, the provision of contact locations can be dispensed with. In this case, the heat transfer between radio frequency chip and rear side conductor layer can be effected, in principle, by the part of the electrically insulating layer between radio frequency chip and rear side conductor layer, said part being thin in the region of the radio frequency chip.

In a next step, a rigid supporting layer is preferably applied on the electrically insulating layer and/or the rear side conductor layer. A supporting layer is deemed to be "rigid" within the meaning of the invention if it has a sufficient thickness such that undesired bending of the supporting layer or of the radio frequency transmitting/receiving element does not occur in the radio frequency transmitting/receiving element after the removal of the temporary rigid carrier, under customary loadings. The supporting layer can be applied by any arbitrary method known to the person skilled in the art, wherein the rigid supporting layer is preferably composed of composite material, such as e.g. an FR4 composite material. Particularly if a rear side conductor layer or a rear side contacting, that is to say the provision of contact locations between radio frequency layer and rear side conductor layer, is dispensed with, the supporting layer can also be applied simultaneously with the electrically insulating layer.

For reasons of symmetry, a further electrically insulating layer can also be applied on the rigid supporting layer, said further electrically insulating layer preferably being composed of the same, preferably radio frequency-suitable, material as the electrically insulating layer arranged directly on the conductor pattern structure. In this case, the further electrically insulating layer can in particular also have the thickness of the first electrically insulating layer and be applied simultaneously with or after the supporting layer.

It is optionally possible, before or after the removal of the temporary rigid carrier, for at least one depression to be introduced into the rigid supporting layer in order to form at least one bending region, e.g. by a depth milling of the rigid supporting layer being carried out. In this case, the depression can project right into the electrically insulating layer. In the region of the depression, the bending stiffness of the radio frequency transmitting/receiving element is reduced in such a way that bending of the radio frequency transmitting/receiving element is possible after the removal of the temporary rigid carrier. As a result, it is possible for the radio frequency transmitting/receiving element to comprise a plurality of regions arranged at an angle with respect to one another, in order to achieve a spatial coverage in the case where the regions are correspondingly equipped with antennas. However, it is also possible for the depression to reach only as far as the rear side conductor layer or for just the material thickness of the rigid supporting layer in the bending region to be reduced (e.g. to 30-50 µm) by recessing in such a way that bending of the radio frequency transmitting/receiving element becomes possible in this region.

In this case, it is preferred if the at least one bending region is free of radio frequency chips. In other words, the arrangement of the at least one radio frequency chip is intended to be such that they are not arranged in the at least one bending region. If the bending region is free of radio frequency chips, it is possible to preclude damage to the at least one radio frequency chip on account of bending in the bending regions provided therefor. If the at least one bending region is free of conductor tracks both of the conductor pattern structure and of the rear side conductor layer, a separate radio frequency chip is to be provided for each region of the radio frequency transmitting/receiving element that is separated by bending regions and can be arranged at an angle with respect to one another, given corresponding equipment with antennas.

However, if conductor tracks of the conductor pattern structure and/or of the rear side conductor layer preferably extend over a bending region, it is also possible, by contrast, to provide a radio frequency chip that is connected to antennas on both sides of the bending region at issue. It is thus possible for all antennas of the radio frequency transmitting/receiving element, even if they are arranged on different regions of the radio frequency transmitting/receiving element that are arranged at an angle with respect to one another, to be connected to a common radio frequency chip. In this case, it is particularly preferred if conductor tracks of the conductor pattern structure and also conductor tracks of the rear side conductor layer are led over the bending region. If e.g. the conductor track of the rear side conductor layer is embodied over the whole area, undesired capacitive effects can be avoided even in the bending region given suitable connection of the rear side conductor layer to earth.

Finally, the temporary rigid carrier is removed, e.g. by etching. Procedures suitable therefor are known to the person skilled in the art. The same applies to the possibly required exposure of the conductor pattern structure after the detachment of the carrier, that is to say the removal of possible copper residues. Moreover, plated-through holes proceeding from the conductor pattern structure comprising the antenna structure to underlying layers, such as e.g. the rear side conductor layer, can also be provided.

If the radio frequency transmitting/receiving element has bending regions, the radio frequency transmitting/receiving element can be bent along these regions after the removal of the rigid carrier. In order to protect the bending regions from undesired bending during production and further processing, a stabilizing frame can be fitted around the RF element, said frame simplifying further processing.

The radio frequency transmitting/receiving element can be configured e.g. for communication applications. However, the radio frequency transmitting/receiving element is preferably a radar element, e.g. for use as a distance warning unit in automobiles. In this case, the radio frequency antenna can also be referred to as a radar antenna, and the radio frequency chip as a radar chip.

For elucidation of the radio frequency transmitting/receiving element according to the invention, reference is made to the explanations above.

BRIEF DESCRIPTION OF THE DRAWINGS

The invention will now be described by way of example on the basis of advantageous embodiments with reference to the accompanying drawings, in which.

DETAILED DESCRIPTION OF THE INVENTION

Figure 1:
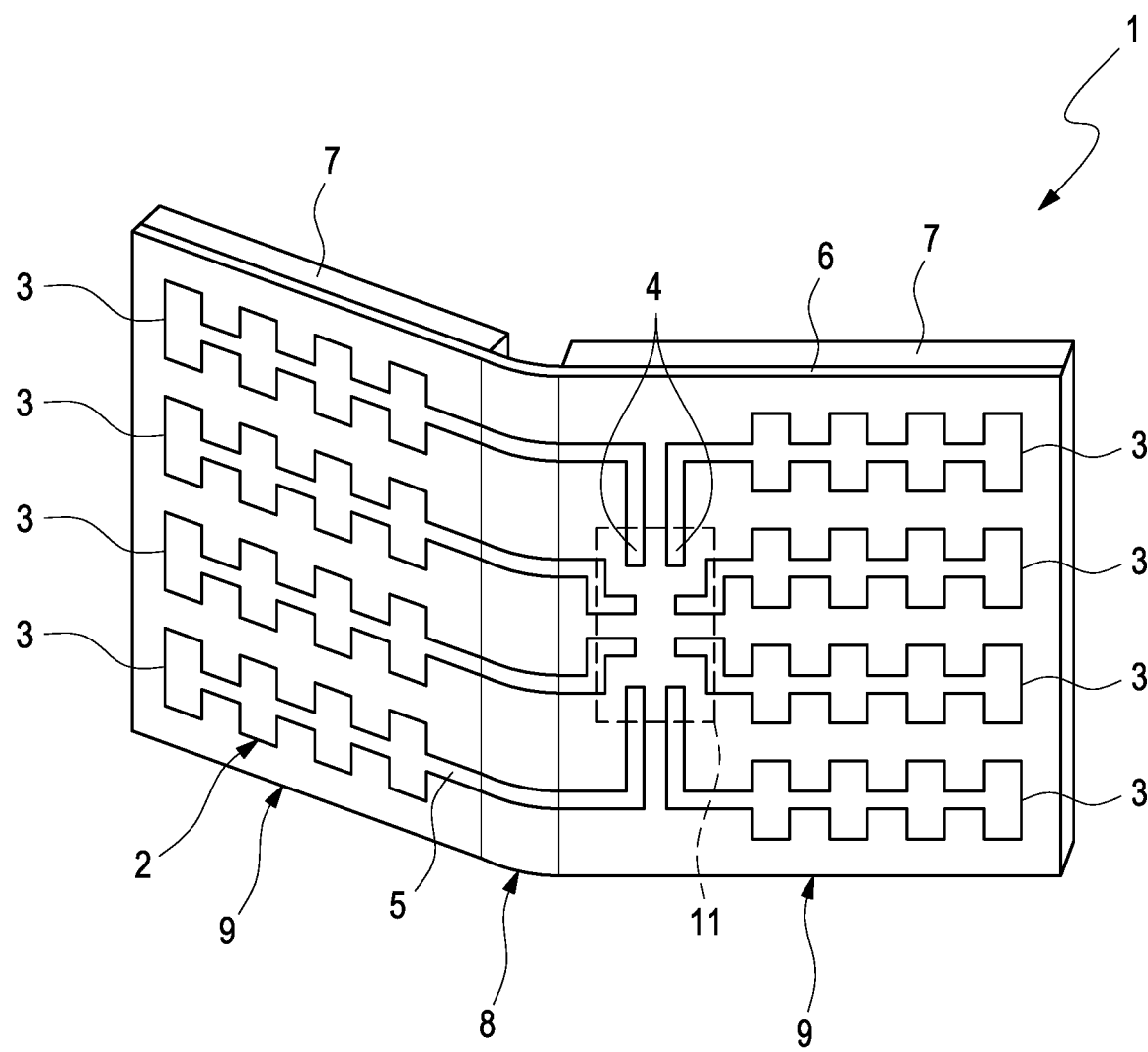
FIG. 1: shows a first exemplary embodiment of a radio frequency transmitting/receiving element according to the invention.

FIG. 1 illustrates a first exemplary embodiment of a radio frequency transmitting/receiving element 1 according to the invention. The radio frequency transmitting/receiving element 1 comprises a conductor pattern structure 2, which extends over one side of the radio frequency transmitting/receiving element 1 and comprises a plurality of antenna structures 3, wherein one portion of the antenna structures 3 is configured as transmitting antennas, and another portion as receiving antennas for radio frequency signals. The conductor pattern structure 2 furthermore comprises connection contacts 4, which are connected to the antenna structures 3 via leads 5.

The conductor pattern structure 2 is applied on an electrically insulating layer 6 composed of radio frequency-suitable material. In this case, the electrically insulating layer 6 is flexible, in principle. In the regions in which the antenna structures 3 are arranged, however, a rigid supporting layer 7 is in each case arranged on that side of the electrically insulating layer 6 which faces away from the conductor pattern structure 2, such that the radio frequency transmitting/receiving element 1 is flexible ultimately only in the intervening bending regions 8—in which only the electrically insulating layer 6 is provided, but not a rigid supporting layer 7. As illustrated, the radio frequency transmitting/receiving element 1 is divided into regions 9 which are separated by the bending regions 8, can be arranged at an angle with respect to one another and respectively have antenna structures 3.

In one rigid region 9, a radio frequency chip 11 is integrated into the electrically insulating layer 6, said radio frequency chip being indicated by a dashed line in FIG. 1. The radio frequency chip is directly connected to the connection contacts 4 and completely surrounded by the electrically insulating layer 6.

In this case, the radio frequency chip is situated exclusively in one of the rigid regions 9 of the radio frequency transmitting/receiving element 1 and thus in particular does not extend into the bending region 8. The situation is different with the conductor pattern structure 2: in order that those antenna structures 3 which are situated in the other rigid region 9 can also be connected to the radio frequency chip 11 arranged there, individual leads 5 of the conductor structure extend from said antenna structures 3 over the bending region 8 to connection contacts 4 connected to the radio frequency chip 11.

For reasons of clarity, FIG. 1 does not illustrate the rear side conductor layer 14 arranged between the electrically insulating layer 6 and the rigid supporting layer 7 in the central rigid region, leads for supplying the radio frequency chip 11 with electrical energy and control signals, and plated-through holes proceeding from the conductor pattern structure 2.

The method for producing a radio frequency transmitting/receiving element 1 according to the invention, similar to that from FIG. 1, is illustrated schematically in several sectional views in FIGS. 2a-g.

Figure 2:
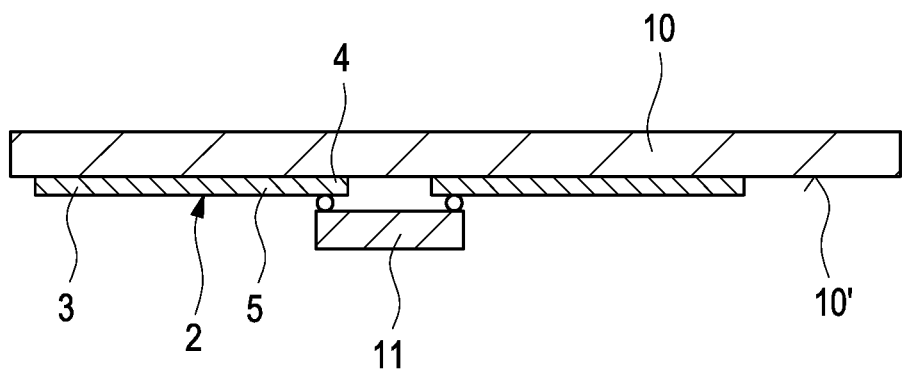
FIGS. 2a-g: show schematic illustrations of the method steps for producing a radio frequency transmitting/receiving element according to the invention.
Figure 2:
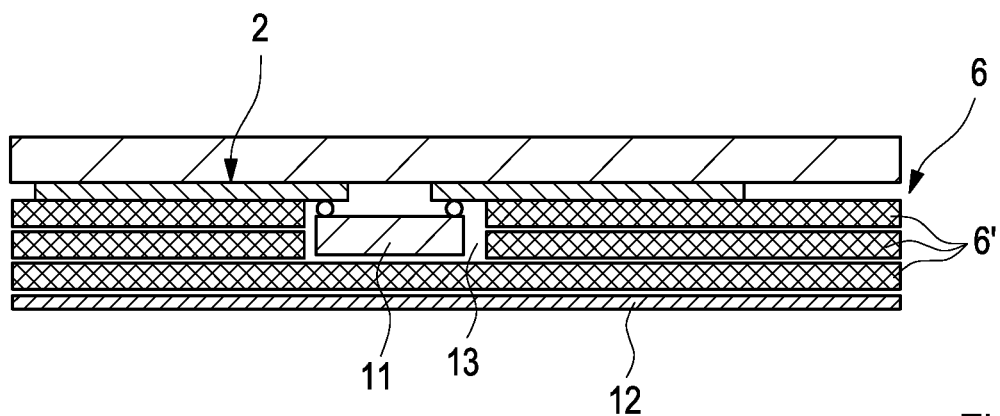
Figure 2:
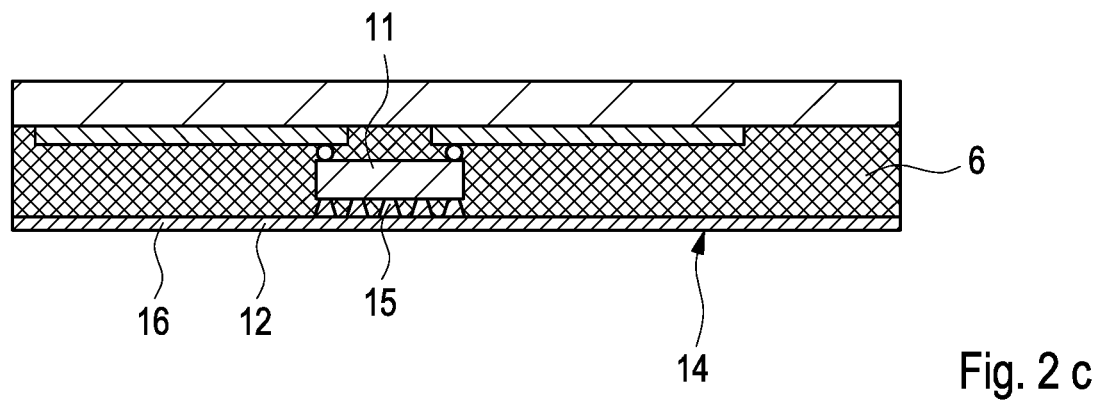
Figure 2:
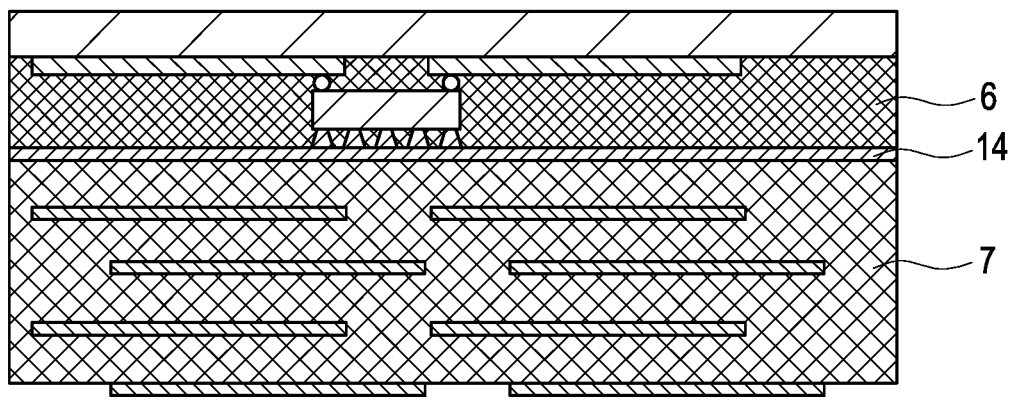
Figure 2:
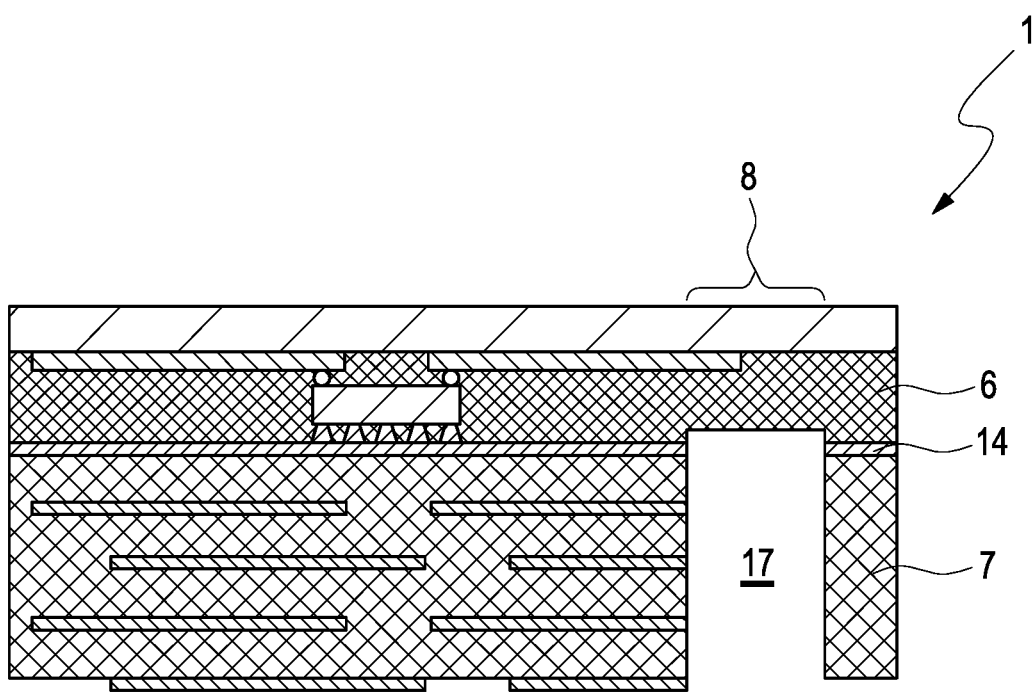
Figure 2:
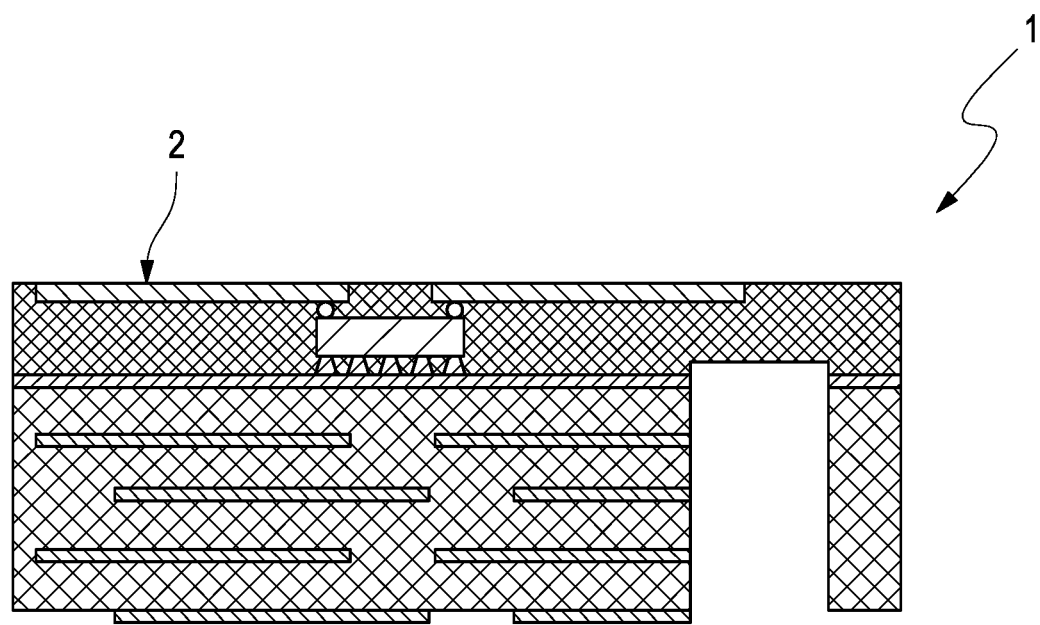
Figure 2:
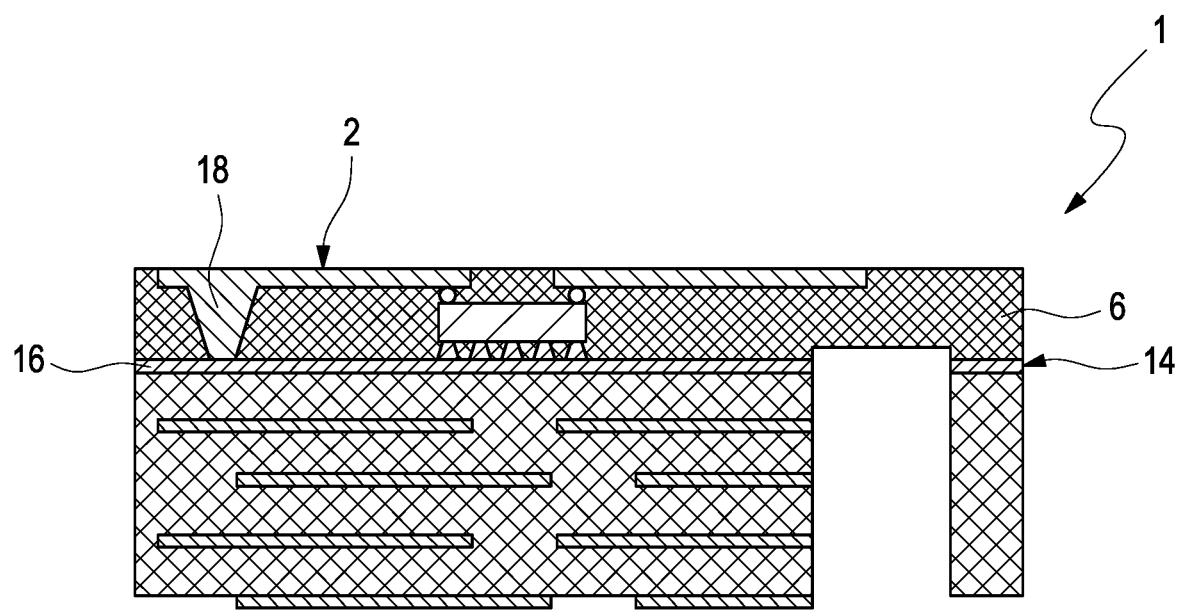

At the beginning of the method, on a planar surface 10' of a temporary rigid carrier 10 provided, said surface being formed from a thin copper layer, firstly the conductor pattern structure 2 comprising at least one antenna structure 3 and also leads 5 and connection contacts 4 is applied before a radio frequency chip 11 is subsequently secured directly on the connection contacts 4. The result of these steps is illustrated in FIG. 2a.

The temporary rigid carrier 10 is composed of nickel-plated copper with a copper-nickel-copper layer construction, the copper ply mentioned last having a smaller thickness than that mentioned first. The temporary rigid carrier 10 has a thickness such that it does not deform impermissibly under the loadings that occur in the method steps described below for producing the radio frequency transmitting/receiving element 1.

The conductor pattern structure 2 comprises an antenna structure 3 and also connection contacts 4, as is shown by way of example in FIG. 1. The conductor pattern structure 2 can be applied e.g. photolithographically and electrolytically by techniques known to the person skilled in the art. Methods known from the prior art can likewise be employed for equipping the conductor pattern structure 2 with the at least one radio frequency chip 11. The connection contacts of the chip are reworked, if appropriate, for the connection technique respectively used.

An electrically insulating layer 6 is subsequently applied to the conductor pattern structure 2. As indicated in FIG. 2b, the electrically insulating layer 6 is constructed from radio frequency-suitable preimpregnated fibre mats 6' that are stacked and subsequently pressed in a known manner. The two fibre mats 6' nearer to the conductor pattern structure 2 each have a cutout 13, while the third fibre mat 6' is fully continuous over its area. The cutouts 13 in a portion of the fibre mats 6' give rise to a cavity, into which the radio frequency chip 11 is received. An electrically conductive copper film 12 is applied on the side facing away from the conductor pattern structure 2.

As a result of the pressing of the preimpregnated fibre mats 6' and the copper film, the resin of the fibre mats 6' passes into the interspaces 13 between the radio frequency chip 11 and the fibre mats 6', said interspaces surrounding the radio frequency chip 11, but also between the radio frequency chip 11 and the conductor pattern structure 2 or the surface 10' of the temporary rigid carrier 10. After the pressing of the fibre mats 6', the radio frequency chip 11 is then completely surrounded by the electrically insulating layer.

If the resin emerging from the fibre mats 6' does not suffice to fill all the interspaces 13 surrounding the radio frequency chip 11, provision can also be made for applying underfilling methods to the radio frequency chip 11 before the electrically insulating layer 6 is applied, by which underfilling methods at least the region between the radio frequency chip 11 and the conductor pattern structure 2 or the surface 10' of the temporary rigid carrier 10 is filled with electrically insulating, radio frequency-suitable material. The electrically insulating layer 6 thus produced is non-destructively flexible, in principle, after pressing.

After the electrically insulating layer 6 has been completed, a rear side conductor layer 14 with rear side contacting is provided. To that end, firstly perforations are introduced into the electrically insulating layer 6 and the copper film 12, e.g. by laser processing. Afterwards, in a process sequence known to the person skilled in the art, a copper layer is applied electrolytically, wherein the copper on the one hand fills the perforations, in order thus to provide contact locations 15 with the radio frequency chip 11, and otherwise is arranged in the form of at least one conductor track 16 of the rear side conductor layer 14 on the electrically insulating layer 6. It is also possible firstly to apply the copper layer over the whole area and subsequently to introduce the conductor tracks 16 there, e.g. by photolithography and etching.

In the exemplary embodiment illustrated, the rear side conductor layer 14 serves for heat spreading, that is to say for distributing the heat generated by the radio frequency chip 11 over a larger area for the purpose of cooling, and also for reducing capacitive effects. To that end, the rear side conductor layer 14 comprises just a single conductor track 16, which covers the entire rear side of the electrically insulating layer 6.

In a next step, a supporting layer 7 composed of an FR4 composite material is applied on the electrically insulating layer 6 or the rear side conductor layer 14 (see FIG. 2d). In this case, the supporting layer 7 is so rigid that no undesired bending deformation occurs for the radio frequency transmitting/receiving element 1 in the regions in which the supporting layer 7 exists completely, under the realistically expected external loadings on the radio frequency transmitting/receiving element 1. The supporting layer 7 can be constructed in a multilayered fashion with a plurality of conductive layers and electronic components integrated into the supporting layer 7.

In order subsequently to form bending regions 8, at which the radio frequency transmitting/receiving element 1 is intended to be able to be bent (also cf. FIG. 1), a depression 17 in the form of a groove is introduced into the radio frequency transmitting/receiving element 1 by depth milling, said depression extending through the entire rigid supporting layer 7 and the rear side conductor layer 14 right into the electrically insulating layer 6. Since the electrically insulating layer 6 is flexible and a stiffening element is no longer present in the bending region 8 after the detachment (see FIG. 2f) of the temporary rigid carrier 10, the radio frequency transmitting/receiving element can be bent non-destructively along the bending region 8.

The temporary rigid carrier 10 can be detached by methods known from the prior art. The same also applies to the possibly required exposure of the conductor pattern structure 2, that is to say the removal of possible copper residues that remain on the conductor pattern structure 2 after the detachment of the temporary rigid carrier 10.

As illustrated in FIG. 2g, provision can also be made of a plated-through hole 18 from the conductor pattern structure 2 through the electrically insulating layer 6 as far as the rear side conductor layer 14, which plated-through hole can be produced according to any arbitrary known method. As a result, it is possible to connect the conductor track 16 of the rear side conductor layer 14 to earth.

Figure 3:
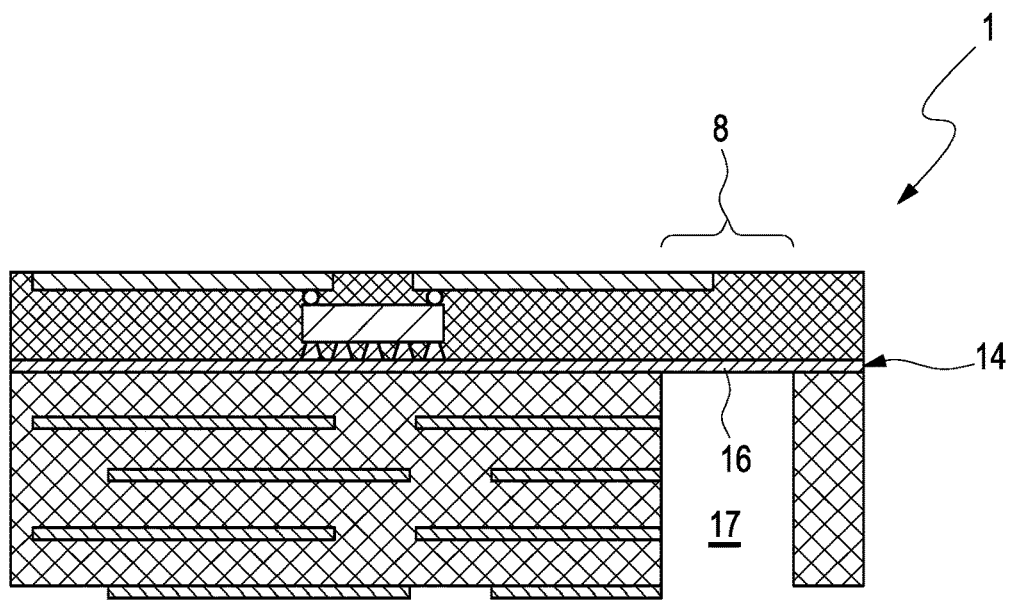
FIGS. 3a-c: show schematic illustrations of variants with respect to the method according to FIGS. 2a-f.
Figure 3:
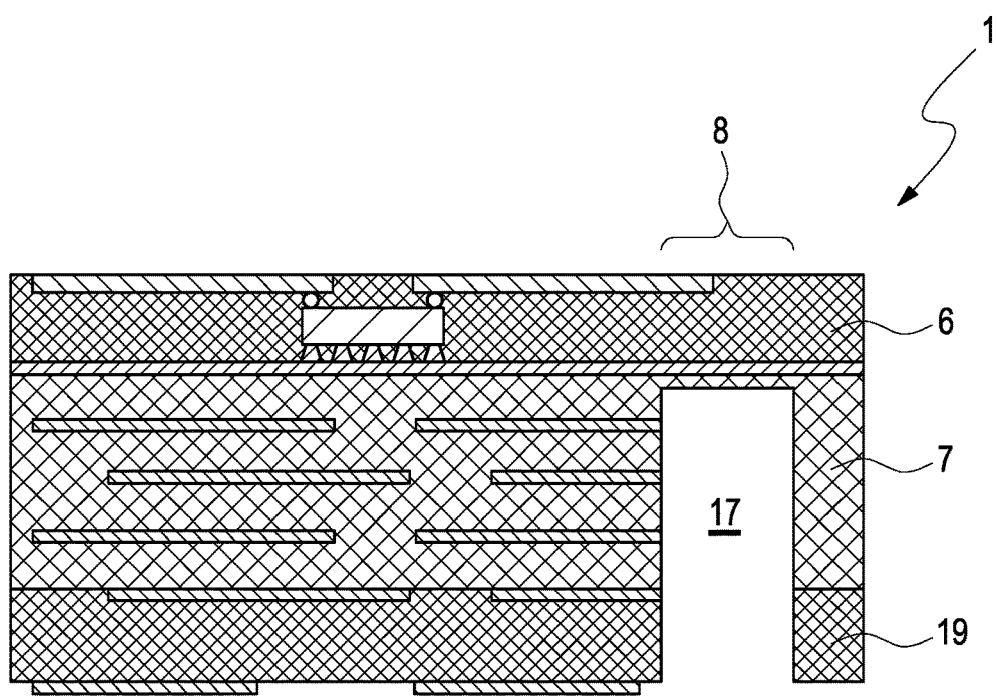
Figure 3:
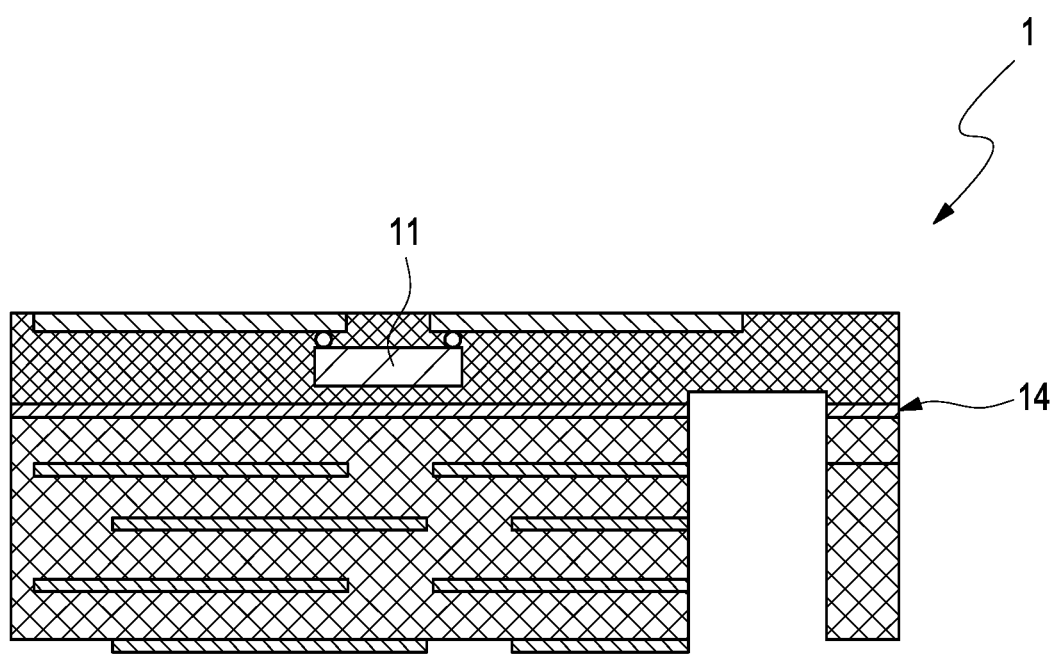

FIGS. 3a, b and c illustrate variants with respect to the radio frequency transmitting/receiving element 1 produced by the method in accordance with FIGS. 2a-f.

In the case of the embodiment variant in accordance with FIG. 3a, the depression 17 embodied as a groove introduced by depth milling extends only to directly before the rear side conductor layer 14, such that the conductor tracks 16 of the rear side conductor layer 14 can extend beyond the bending region 8.

In the case of the embodiment variant in accordance with FIG. 3b, a further electrically insulating layer 19 is arranged on that side of the rigid supporting layer 7 which faces away from the electrically insulating layer 6, said further electrically insulating layer being composed of the same material as the electrically insulating layer 6 and moreover having the same thickness. A symmetrical construction is achieved by means of the further electrically insulating layer 19.

Moreover, in the case of the embodiment variant in accordance with FIG. 3b, the depression 17 does not extend as far as the rear side conductor layer 14. Rather, a thin layer (approximately 30-50 μm) of the supporting layer 7 still remains also in the region of the depression 17. On account of the small material thickness, however, the radio frequency transmitting/receiving element 1 can nevertheless still be bent well in the bending region 8.

The embodiment variant in accordance with FIG. 3c differs from that from FIGS. 2a-g in particular in that the provision of contact locations 15 between rear side conductor layer 14 and radio frequency chip 11 was dispensed with. On account of the small material thickness between rear side conductor layer 14 and radio frequency chip 11 in the region of the radio frequency chip 11, however, there is a sufficient heat transfer between radio frequency chip 11 and rear side conductor layer 14.

For further elucidation of the embodiment variants in accordance with FIGS. 3a-c and in particular the production thereof, reference is made to the explanations concerning FIGS. 2a-g.

In all the exemplary embodiments, the radio frequency transmitting/receiving element 1 is a radar element, as a result of which the radio frequency chip 11 is a radar chip. In all the exemplary embodiments—in so far as not already illustrated—plated-through holes that are familiar to the person skilled in the art can be provided between the individual electrically conductive plies.

The invention claimed is:

1. A method for producing a radio frequency transmitting/receiving element comprising at least one radio frequency antenna and at least one radio frequency chip, comprising the following steps:
   a. providing a temporary rigid carrier;
   b. applying a conductor pattern structure comprising an antenna structure of the at least one radio frequency antenna and connection contacts for the at least one radio frequency chip, the connection contacts being connected to the at least one radio frequency antenna via leads;
   c. directly connecting the at least one radio frequency chip to the connection contacts of the conductor pattern structure;
   d. applying an electrically insulating layer on the conductor pattern structure, such that the at least one radio frequency chip is surrounded by the electrically insulating layer; and
   e. removing the temporary rigid carrier.

2. The method according to claim 1, wherein applying the electrically insulating layer on the conductor pattern structure is carried out in such a way that the at least one radio frequency chip is completely surrounded by the electrically insulating layer.

3. The method according to claim 1, wherein after applying an electrically insulating layer on the conductor pattern structure, a rear side conductor layer of the at least one radio frequency chip is provided, at least one conductor track of the rear side conductor layer is arranged on the electrically insulating layer and which leads into at least one contact location which projects through the electrically insulating layer to the radio frequency chip and is connected thereto.

4. The method according to claim 1, wherein a rigid supporting layer is applied before the step of removing the temporary rigid carrier.

5. The method according to claim 4, wherein a further electrically insulating layer is applied on the rigid supporting layer before the step of removing the temporary rigid carrier, which further electrically insulating layer is composed of the same material as the electrically insulating layer arranged directly on the conductor pattern structure or has the same thickness.

6. The method according to claim 4, wherein before or after the step of removing the temporary rigid carrier, at least one depression of the rigid supporting layer is introduced for forming at least one bending region, by a depth milling being carried out.

7. The method according to claim 6, wherein the at least one depression projects into the electrically insulating layer.

8. The method according to claim 6, wherein the at least one bending region is free of radio frequency chips, conductor tracks of the conductor pattern structure or conductor tracks of the rear side conductor layer.

9. The method according to claim 4, wherein the rigid supporting layer is composed of composite material.

10. The method according to claim 1, wherein the electrically insulating layer is composed of radio frequency-suitable material or is flexible.

11. The method according to claim 1, wherein the temporary rigid carrier is composed of copper, nickel-plated copper, a copper-nickel-copper layer construction, or copper-plated aluminum.

12. The method according to claim 1, wherein the radio frequency transmitting/receiving element is a radar element.

13. A radio frequency transmitting/receiving element, comprising:
   at least one radio frequency antenna and at least one radio frequency chip;
   the at least one radio frequency antenna is an antenna structure embodied as part of a planar conductor pattern structure applied on an electrically insulating layer;
   the at least one radio frequency antenna is connected to a radio frequency chip;
   the at least one radio frequency chip is directly connected to connection contacts embodied as part of the conductor pattern structure, the connection contacts being connected to the at least one radio frequency antenna via leads, and the at least one radio frequency chip is integrated into the electrically insulating layer in such a way that it is surrounded by the electrically insulating layer.

14. The radio frequency transmitting/receiving element according to claim 13, wherein the radio frequency chip is completely surrounded by the electrically insulating layer.

15. The radio frequency transmitting/receiving element according to claim 13, wherein
   a rear side conductor layer of the at least one radio frequency chip is provided on the electrically insulating layer, said rear side conductor layer being configured as a heat spreading layer.

16. The radio frequency transmitting/receiving element according to claim 13, wherein the electrically insulating layer, on its side facing away from the conductor pattern structure, is at least partly arranged on a rigid supporting layer.

17. The radio frequency transmitting/receiving element according to claim 16, wherein the radio frequency transmitting/receiving element has at least one bending region in which the rigid supporting layer is at least partly removed.

18. The radio frequency transmitting/receiving element according to claim 16, wherein
   a further electrically insulating layer is provided on a side of the rigid supporting layer that faces away from the electrically insulating layer, the further electrically insulating layer is composed of the same material as the electrically insulating layer arranged directly on the conductor pattern structure or has the same thickness.

19. The radio frequency transmitting/receiving element according to claim 17, wherein the at least one bending region is free of radio frequency chips, conductor tracks of the conductor pattern structure or conductor tracks of the rear side conductor layer.

20. The radio frequency transmitting/receiving element according to claim 13, wherein the radio frequency transmitting/receiving element is a radar element.

* * * * *